United States Patent
de Boer (10) Patent No.: US 10,006,438 B2
(45) Date of Patent: Jun. 26, 2018

(54) METHOD FOR OPERATING A WIND TURBINE

(71) Applicant: Wobben Properties GmbH, Aurich (DE)

(72) Inventor: Wolfgang de Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 34 days.

(21) Appl. No.: 14/682,940

(22) Filed: Apr. 9, 2015

(65) Prior Publication Data
US 2015/0211486 A1   Jul. 30, 2015

Related U.S. Application Data

(63) Continuation-in-part of application No. PCT/EP2013/070030, filed on Sep. 26, 2013.

(30) Foreign Application Priority Data

Oct. 10, 2012   (DE) .................. 10 2012 218 484

(51) Int. Cl.
*F03D 9/00*   (2016.01)
*F03D 7/02*   (2006.01)
(Continued)

(52) U.S. Cl.
CPC ......... *F03D 7/0224* (2013.01); *F03D 7/0204* (2013.01); *F03D 7/048* (2013.01);
(Continued)

(58) Field of Classification Search
CPC ...... F03D 7/0204; F03D 7/0224; F03D 9/005; F05B 2260/96
(Continued)

(56) References Cited

U.S. PATENT DOCUMENTS 6,525,518 B1   2/2003   Garnaes
7,220,104 B2   5/2007   Zheng et al.
(Continued)

FOREIGN PATENT DOCUMENTS

CN   102498289 A   6/2012
DE   699 01 876 T2   2/2003
(Continued)

*Primary Examiner* — Julio C. Gonzalez Ramirez
(74) *Attorney, Agent, or Firm* — Seed IP Law Group LLP (57) ABSTRACT

The invention relates to a method for operating at least a first wind turbine including the steps of: recording a tower oscillation, initiating a measure to reduce oscillation if the tower oscillation is or contains a longitudinal oscillation, and if the amplitude of the longitudinal oscillation exceeds a predefined threshold value, and the measure for reducing the oscillation comprises freezing the current pitch angle at the current value for a predefined freezing period, switching the pitch control algorithm used, in particular in such a way that the control speed is reduced, adjusting the yaw position by a predefined yaw angle, switching the operation of the first wind turbine from a first operating mode based on a first power curve to a second operating mode based on a second power curve, and/or if, with regard to the current wind direction, the first wind turbine in a wind park is located behind a second wind turbine, adjusting the rotational speed of the first wind turbine to the rotational speed of the second wind turbine in such a way that the rotational speed of the first wind turbine differs from the rotational speed of the second wind turbine by at least a predefined differential rotational speed.

21 Claims, 7 Drawing Sheets

(51) Int. Cl.
  *F03D 7/04* (2006.01)
  *F03D 9/25* (2016.01)
(52) U.S. Cl.
  CPC .......... *F03D 9/257* (2017.02); *F05B 2260/96* (2013.01); *Y02E 10/721* (2013.01); *Y02E 10/723* (2013.01)
(58) Field of Classification Search
  USPC .............. 290/44, 55; 415/1; 416/1; 700/286, 700/287, 288
  See application file for complete search history.

(56) References Cited

U.S. PATENT DOCUMENTS

| | | | | |
|---|---|---|---|---|
| 7,851,934 | B2* | 12/2010 | Nyborg | F03D 7/0224 290/44 |
| 8,116,914 | B2* | 2/2012 | Oohara | F03D 7/0224 290/44 |
| 8,247,913 | B2* | 8/2012 | von Mutius | F03D 7/0224 290/44 |
| 2004/0108729 | A1* | 6/2004 | Wobben | F03D 7/0296 290/44 |
| 2008/0067815 | A1* | 3/2008 | Suryanarayanan | F03D 7/0272 290/44 |
| 2008/0206051 | A1* | 8/2008 | Wakasa | F03D 7/0224 416/41 |
| 2009/0174186 | A1* | 7/2009 | Nyborg | F03D 7/0224 290/44 |
| 2009/0174187 | A1* | 7/2009 | Nyborg | F03D 7/0224 290/44 |
| 2009/0200804 | A1* | 8/2009 | Nielsen | F03D 7/0212 290/44 |
| 2009/0295161 | A1 | 12/2009 | Steiner et al. | |
| 2010/0119369 | A1 | 5/2010 | Risager et al. | |
| 2010/0133827 | A1* | 6/2010 | Huang | F03D 7/0224 290/44 |
| 2010/0274400 | A1* | 10/2010 | Ormel | F03D 7/043 700/287 |
| 2011/0076142 | A1* | 3/2011 | Veldkamp | F03D 7/0224 416/1 |
| 2011/0115233 | A1 | 5/2011 | Schröppel | |
| 2011/0153096 | A1* | 6/2011 | Pal | F03D 7/047 700/287 |
| 2011/0204636 | A1* | 8/2011 | Scholte-Wassink | F03D 7/0296 290/44 |
| 2012/0121413 | A1 | 5/2012 | Rodriguez Tsouroukdissian | |
| 2012/0139240 | A1* | 6/2012 | Otamendi Claramunt | F03D 7/0224 290/44 |
| 2012/0200087 | A1 | 8/2012 | Schindele et al. | |
| 2014/0003936 | A1* | 1/2014 | Agarwal | F03D 7/02 416/1 |

FOREIGN PATENT DOCUMENTS

| | | |
|---|---|---|
| DE | 10 2006 001 613 A1 | 7/2007 |
| DE | 10 2008 009 740 A1 | 8/2009 |
| DE | 10 2009 039 340 A1 | 3/2011 |
| EP | 1 719 910 A1 | 11/2006 |
| JP | 723586 Y2 | 5/1995 |
| JP | 2002509222 A | 3/2002 |
| JP | 2009523208 A | 6/2009 |
| RU | 2382897 C2 | 2/2010 |
| SU | 3739 A1 | 10/1927 |
| SU | 348762 A1 | 8/1972 |
| WO | 2007/089136 A2 | 8/2007 |
| WO | 2010/084131 A2 | 7/2010 |
| WO | 2012/125842 A2 | 9/2012 |

\* cited by examiner

METHOD FOR OPERATING A WIND TURBINE

BACKGROUND

Technical Field

The present invention relates to a method for operating at least one wind turbine. The present invention relates further to a wind turbine and it relates to a wind farm. In addition, it relates to a method for operating a wind farm.

Description of the Related Art

Figure 1:
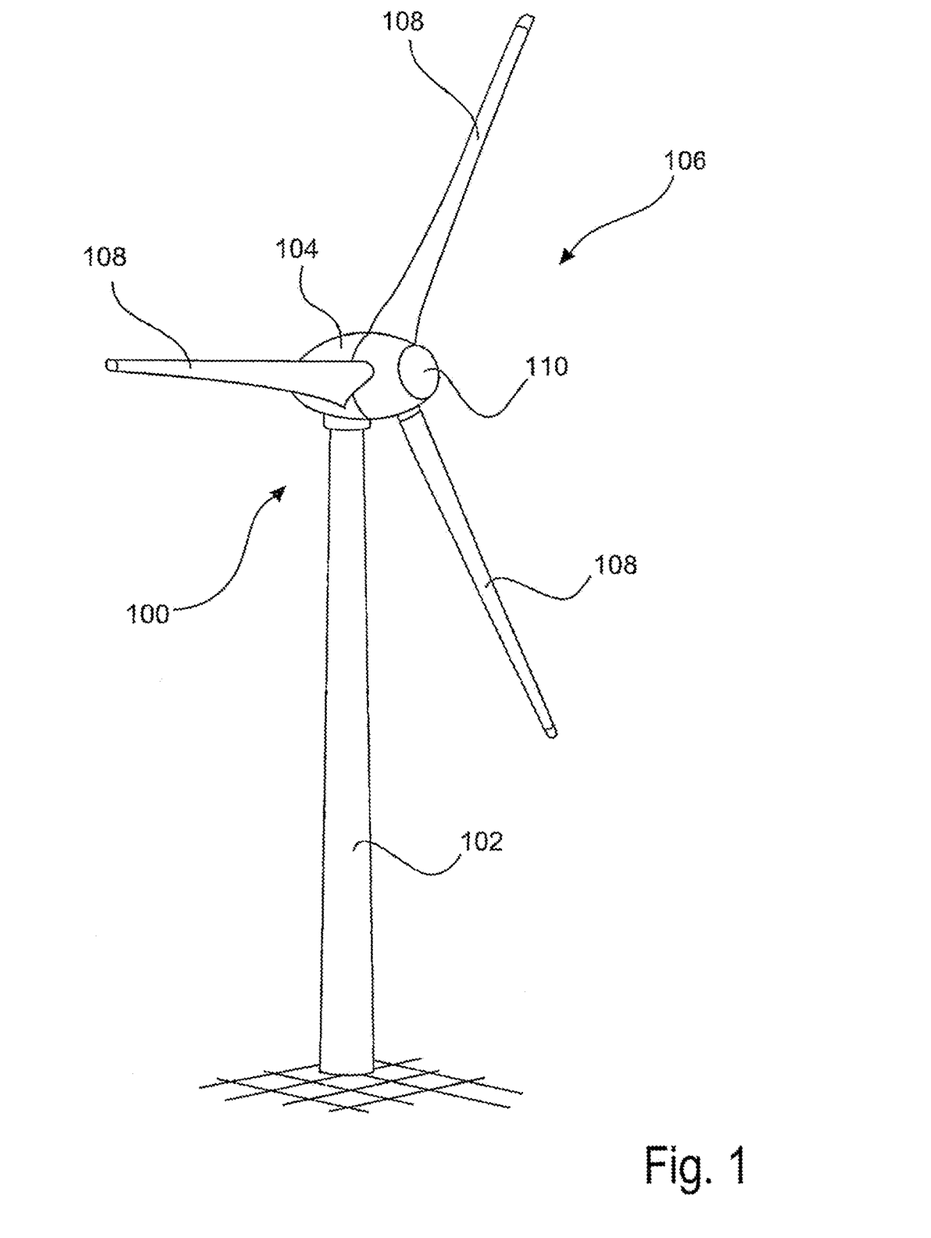
FIG. 1 shows a wind turbine in a perspective view.

Wind turbines are generally known, they transform, in particular by means of a rotor, which rotates around an essentially horizontally arranged axis, mechanical wind power into electrical energy, for which, in addition, an electric generator is used. A schematic view of an example of such a wind turbine is shown in FIG. 1.

It can occur that such a wind turbine starts oscillating and that these oscillations even affect the tower, which supports the aerodynamic rotor of the wind turbine. Generally, a differentiation is made between two types of oscillation, namely longitudinal oscillations and transverse oscillations, which, in principle, can also cancel each other out.

Essentially, transverse oscillation is oscillation that occurs transversely to the orientation of the rotor axis. Often, such transverse oscillation is caused by an imbalance of the rotor and thus oscillates correspondingly with the rotational speed of the rotor. Since, during rotation, this rotational imbalance directly causes these oscillations, they can also be referred to as forced oscillations.

Essentially, longitudinal oscillation occurs in the longitudinal direction of the rotation axis of the rotor. Thus, the wind turbine oscillates back and forth so to speak. In most cases, such longitudinal oscillations are caused by the wind and regularly interact with properties of the wind turbine. In particular, the oscillation frequency of such longitudinal oscillation orients itself on a natural frequency or a resonance frequency—which are usually very similar to each other—or on many such frequencies. Especially if the wind itself is volatile it can initiate such a longitudinal oscillation. Longitudinal oscillation can also be caused or increased by the fact that, through its control system, the wind turbine reacts to an increase in wind, including gusts of wind, and thus influences the motion of the wind turbine, wherein, in response to this regulating action, the reaction of the wind turbine leads to another change, which, in the worst case, can lead to oscillation.

A possible regulating action that could cause or increase such oscillation is the so-called pitch control, where the rotor blade angle is adjusted by a respective adjustment drive. Thus, increased wind pressure, for example, can be reduced by the respective adjustment of the rotor blades, through which, in turn, the wind pressure might become too weak so that the rotor blades have to be adjusted back until the wind pressure possibly becomes too high again, causing the pitch control to react once again, thereby possibly causing oscillating behavior.

With regard to the control system, such a problem could, of course, be taken into account, for example by setting up appropriate damping or by using more complex regulators, including, for example, a disturbance observer for an improved ability to take the disturbance into account. In this context, there is however the problem that such a change in the regulation structure may regularly have unforeseeable consequences. In addition, each wind turbine is individual and reacts individually. Naturally, one of the reasons for this is that each wind turbine is installed at a different location and that, therefore, conditions are never identical.

Another problem, which the present invention is also based on and which might have not been noticed in prior art, can occur in the case of several wind turbines impacting each other. In particular, in such a case, one can observe a phenomenon where a first wind turbine in a specific operating status is located, in particular in case of a certain wind direction, in the wind shadow behind a second wind turbine. In addition to the known energy deficits of the wind turbine in the wind shadow, oscillations can be transferred from the wind turbine in the front, i.e., the second wind turbine, to the wind turbine in the back, i.e., the first wind turbine, or may only be triggered in the wind turbine in the back.

The problem with such influences is, in particular, that they rarely occur and that it is therefore hard or even impossible to study them. Finally, the type of phenomenon being described can only occur if the wind direction is such that the first wind turbine is located behind the second wind turbine. However, even then such influences do not occur in principle but instead depend on other conditions, such as the prevailing wind speed or may be the gustiness of the prevailing wind.

The German Patent and Trade Mark Office researched the following prior art in the priority application: DE 10 2006 001 613 A1, DE 10 2008 009 740 A1, DE 10 2009 039 340 A1, DE 699 01 876 T2, US 2009/0200804 A1, WO 2007/089136 A2 and WO 2012/125842 A2.

BRIEF SUMMARY

One or more embodiments of the invention may address at least one of the problems mentioned above. In particular, a solution proposed counters the described longitudinal oscillations in a simple and uncomplicated manner and, when possible, without affecting existing regulators. At least one alternative solution shall be proposed.

In accordance with one embodiment of the invention, a method is proposed that relates to at least the operation of at least one first wind turbine. Taking into account a second wind turbine or even more wind turbines can make sense, but the method does not necessarily have to depend on a second wind turbine, even after oscillation occurring in a specific case. Finally, at least according to one embodiment, the method can also be implemented on one single wind turbine, even if the problems addressed are possibly only caused or increased by another wind turbine. Preferably, the proposed method does not require identification of the specific cause of the oscillation to be eliminated.

Thus, first of all, the method according to one embodiment of the invention identifies oscillation of the tower. If this oscillation of the tower is a longitudinal oscillation or includes longitudinal oscillation, a measure to reduce the oscillation will be initiated once the amplitude of the longitudinal oscillation exceeds a predefined threshold value. According to one alternative, only the amplitude of one longitudinal oscillation is examined and a measure is introduced accordingly. In this context, there is no need to consider whether or not this longitudinal oscillation, and its recorded longitudinal oscillation amplitude, is superimposed by a transverse oscillation. But, in addition or alternatively, the transverse oscillation can also be taken into account, which, if applicable, might influence the threshold value triggering the measure. Preferably, the threshold value is determined in such a way that the wind turbine will not be overloaded due to an oscillation.

Several versions, which, in principle can also be combined, are now proposed as measures to reduce oscillation. The measure to reduce oscillation can also be simply referred to as oscillation reduction. The decisive factor with regard to the respective measures is that they have to be initiated. Checking whether and to what extent oscillation reduction was actually achieved is not required in the individual case on site during wind turbine operation. Thus, the measures preferably, but not exclusively, relate to control measures.

According to one measure for reducing oscillation, the current pitch angle is frozen or maintained at the current value for a predefined freezing period. Accordingly, the precondition for this is that the wind turbine is pitch controlled. Such a wind turbine has a control algorithm, which adjusts the pitch angle depending on a large variety of different predefined settings. Essentially, this control algorithm runs constantly during wind turbine operation and can lead to constant updating of the pitch angle, which may be desired. For example, the control algorithm constantly sets a desired pitch value, which is implemented by one or several pitch drives for each individual rotor blade or, if applicable, for all the rotor blades. This desired value, in particular, is set at a fixed value when the current pitch angle is frozen. The pitching control algorithm continues to run without changes and, if needs be, continuously calculates a new desired pitch value. However, the pitch value that was newly calculated within this freezing period is not passed on. Of course, the internal realization can also be performed in a different manner.

In any case, this means a pitch movement is stopped for a short time. Thus, a potential oscillation rhythm that has started can be interrupted. In most cases, such a short interruption is sufficient and the control algorithm for the pitch angle can continue to be operated normally afterwards. This stops the oscillation and the pitch control algorithm itself—as well as other control algorithms in the turbine— did not have to be changed or adjusted. In particular, this means no lasting interference with the stability of the overall control concept.

This proposed measure is also based on the finding that such longitudinal oscillations occur comparatively seldom and that—at least presumably—in most cases a large number of circumstances must occur at the same time to cause them. Once the predefined freezing period has passed, there is no longer a situation where such longitudinal oscillation takes place or is caused. In most cases, this short-term freezing measure can remain a one-time measure and might not have to be repeated soon. This measure might even be a one-time measure within the lifespan of the wind turbine.

The freezing period selected can be comparably short and falls preferably in the range between 5 s to 1 min, in particular in the range between 10 to 20 s. This measure for reducing oscillation by freezing the pitch angle aims to interrupt the oscillation once, and thus to create new conditions in which longitudinal oscillation no longer regularly occurs and thus no longer exceeds the predefined threshold value.

Furthermore, the predefined threshold value can be a displacement amplitude of the tower oscillation path, for example in the area of the top of the tower, or even a maximum acceleration.

Additionally or alternatively it is proposed that the pitch algorithm used be changed. Generally, the pitch control is specifically performed by a basic pitch control algorithm or a standard pitch control algorithm. Only if longitudinal oscillation occurs, and the amplitude exceeds the predefined threshold value, will the pitch control algorithm be changed. To this end, a second, alternative pitch control algorithm can be stored, or just one time parameter in the regulation algorithm is changed. In both cases, changing the pitch control algorithm can be performed in such a way that the control speed is reduced. For example, a control time constant can be increased by 10% or by 20%. Once the amplitude of the longitudinal oscillation has diminished and/or at the end of a predefined period, it changes back to the original pitch control algorithm.

Alternatively or additionally, it is proposed that the yaw position be changed by a predefined yaw angle. Such a measure for reducing oscillation is proposed in particular, but not exclusively, for a wind turbine in a wind farm. In such a case, a second wind turbine, which, with regard to the wind, is located in front of the first wind turbine, can affect the wind in such a way that it causes oscillations in the first wind turbine located behind the second one. By slightly adjusting the yaw angle, i.e., the direction of the rotor axis, the influence of such a second wind turbine located in front of the first wind turbine can at least be changed.

In the case of an individual wind turbine, too, changing the yaw position by a small value can reduce any high longitudinal oscillation that has occurred, since, for example certain obstacles in the area of the wind turbine, which may even be located some hundred meters away, cause a certain disadvantageous wind flow, which can be mitigated by even a minimum yaw adjustment.

Preferably, the yaw angle is changed in the range between 2 and 8°, in particular in the range between 4 and 5°. Such oscillation can be prevented even by such a small value and, at the same time, a potential loss in performance due to the yaw angle no longer being set at the optimum value remains small. It can be assumed that the reduced output due to a yaw angle not being set to the optimum value is reduced by the cosine of this yaw angle deviating from the optimum yaw angle. Since in the area around 0, i.e., even up to 8°, the cosine hardly changes, there will hardly be any loss in performance either. It might not even be able to be proven.

The yaw angle can be set back to an optimum value once the longitudinal oscillation has diminished and its amplitude is significantly below the predefined value, or, as an additional or alternative criterion, a predefined waiting period of, for example, one minute or five minutes can be observed before the yaw position is reset. Additionally or alternatively, the yaw position can be set to the nominal value if the wind direction has changed, or at least slightly changed. Since in this case it has to be expected that there is no longer a cause of wind direction-dependent oscillations, and with regard to its yaw angle, the wind turbine can be operated normally again. In any case, this new yaw angle is no longer the original yaw angle from which the wind turbine adjustments to reduce oscillations were made. Such an adjustment of the yaw angle is proposed in particular if a first wind turbine is located exactly in the wind shadow of another one.

Additionally or alternatively, it is proposed that the operation of the first wind turbine be switched from a first to a second operating mode. The first operating mode is based on a first power curve, and, accordingly, the second operating mode is based on a second power curve. In this context, the power curve indicates the connection between performance and rotational speed, and, in particular, performance is set depending on the rotational speed. Thus, the performance is set at the respectively applicable value of the characteristic curve until the rotational speed maintains this value. Such an adjustment by switching the operating mode may be small, but changes one parameter of the wind turbine in such a way that the initial position, which, ultimately, must also have led to the longitudinal oscillation, is changed. After the end of a predefined time, a change back to the first, in particular the standard power curve, is possible. Changing the power curve may, for example, lead anyway to a small change in rotational speed as compared to the previous value. This can be sufficient to interrupt the longitudinal oscillation.

According to another or an alternative embodiment, it is proposed that two wind turbines that influence each other, i.e., through the wind, are synchronized. In this context, it is proposed that the first wind turbine, i.e., the one located in the wind shadow of the second wind turbine, is synchronized with the rotational speed of the second wind turbine, in particular in such a way that the rotational speed of the first wind turbine differs by a minimum predefined differential rotational speed from the rotational speed of the second wind turbine.

The rotational speed of the second wind turbine is preferably at least 0.2 rpm above or below the rotational speed of the second wind turbine. Preferably, it is at least 0.5 rpm above or below the rotational speed of the second wind turbine. This specifically allows the desynchronization of the two wind turbines. This means the rotors of the first and the second wind turbine rotate at least at slightly different rotational speeds and can thus prevent or interrupt oscillations in the first wind turbine caused or supported by the second wind turbine, i.e., the wind turbine in the front.

This measure of specific synchronization between the two rotational speeds can be used for two wind turbines with essentially the same design, but such desynchronization can also be proposed for wind turbines differing from each other. However, such a measure is to be expected more often in the case of two identical wind turbines, since, in most cases, different wind turbines inherently also have different rotational speeds.

Accordingly, the use of a wind turbine with a variable rotational speed is proposed in any case for this measure, but preferably also for other measures. Such a wind turbine with a variable rotational speed can, in particular, use a synchronous generator that generates an alternating current, which is rectified and then fed into the grid through an inverter. In other words, the use of a wind turbine with variable rotational speed and a so-called full power conversion concept is an advantageous embodiment.

Preferably, when the measure for reducing oscillations that proposes switching the operating mode, i.e., switching between two power curves, is used, it is ensured that the power curve of a neighboring wind turbine is not switched, especially if it has the same design. Thus, it is prevented in a targeted manner that, in the case of two wind turbines influencing each other, the proposed measure for reducing longitudinal oscillation is performed identically at both wind turbines, resulting in the oscillation reduction measure being ineffective or not sufficiently effective. The preferred approach is to make the wind turbine in the back, i.e., the first wind turbine, run at a lower, in particular a reduced, rotational speed. This means that, in this case, the power curve or the rotational speed of the wind turbine that is subject to the problematic longitudinal oscillation is changed.

Preferably, the current pitch angle and/or switching of the pitch control algorithm is/are frozen at full-load operation. Full-load operation is the situation, where the prevailing wind speed is the nominal speed, the generated output is the nominal output and/or the rotational speed is approximately the nominal rotation. In this full-load operation, the pitch angle is regularly used to keep the rotational speed constant. Thus, if the actual rotational speed differs by a minimum value from the desired rotational speed, namely the nominal speed, attempts will be made to counter or compensate this by adjusting the pitch angle. Longitudinal oscillations arising directly from such a deviation are to be reduced or eliminated by freezing the pitch angle and/or switching the changed pitch algorithm, which is why it is proposed that these measures be performed in full-load operation.

Additionally or alternatively, the measure of adjusting the yaw position, switching the operation of the first wind turbine and/or changing the rotational speed of the first wind turbine is performed in partial-load operation. Partial-load operation exists when the prevailing wind speed is below the nominal wind speed. In such a partial-load operation, the pitch angle can be set at a constant value. Freezing the pitch angle or switching the pitch algorithm, which is not effective in such cases, thus makes little sense, while a different rotational speed can be set in this case and/or a different power curve can be chosen. In this partial-load operation, the specific rotational speed as well as the specific performance respectively depend on the prevailing wind and constantly change along with the wind. This constant change in rotational speed and/or in performance is taken into account, which is why switching the operation and/or changing the rotational speed is proposed.

Adjusting the yaw position can be useful in this case too, especially if weaker winds prevail. However, the yaw position can also be adjusted in full-load operation.

Preferably, a shift of the power curve, in particular of the second power curve, in the area of transition between partial-load operation and full-load operation is proposed. Thus, an improved or additional intervention option can be created, especially in the transition area if some of the proposed measures do not work or hardly work, by shifting the characteristic curve.

Furthermore, a wind turbine for generating electrical energy from wind, which uses a method according to at least one of the above mentioned embodiments, is proposed.

Preferably, such a wind turbine includes a synchronous generator, which is excited by a direct current and which, in order to reduce oscillations, is changed by a predefined value, namely by a predefined excitation current value. By changing the excitation current and, thus, the excitation of the synchronous generator, the latter can respectively generate more or less output at the same rotational speed. However, this also involves increasing a torque, which counteracts the rotation of the rotor. Through this, the rotational speed of the rotor can be reduced or, if excitation is reduced, be increased. This intervention via excitation is a preferred embodiment, which, in the case of other types of turbines, cannot be implemented at all or not as well. Therefore, preferably, such a wind turbine with a synchronous generator with direct current excitation is proposed.

Furthermore, a wind farm comprising at least one wind turbine, in particular one according to one of the above mentioned embodiments, and/or at least one, preferably at least two, wind turbines, operated by a method according to at least one of the above described embodiments, is proposed.

BRIEF DESCRIPTION OF THE SEVERAL VIEWS OF THE DRAWINGS

The invention is described in more detail below by embodiments as examples with reference to the accompanying figures.

DETAILED DESCRIPTION

FIG. 1 shows a wind turbine 100 with a tower 102 and nacelle 104. A rotor 106 with three rotor blades 108 and a spinner 110 is located on the nacelle 104. The rotor 106 is set in operation by the wind in a rotating movement and thereby drives a generator in the nacelle 104.

Figure 2:
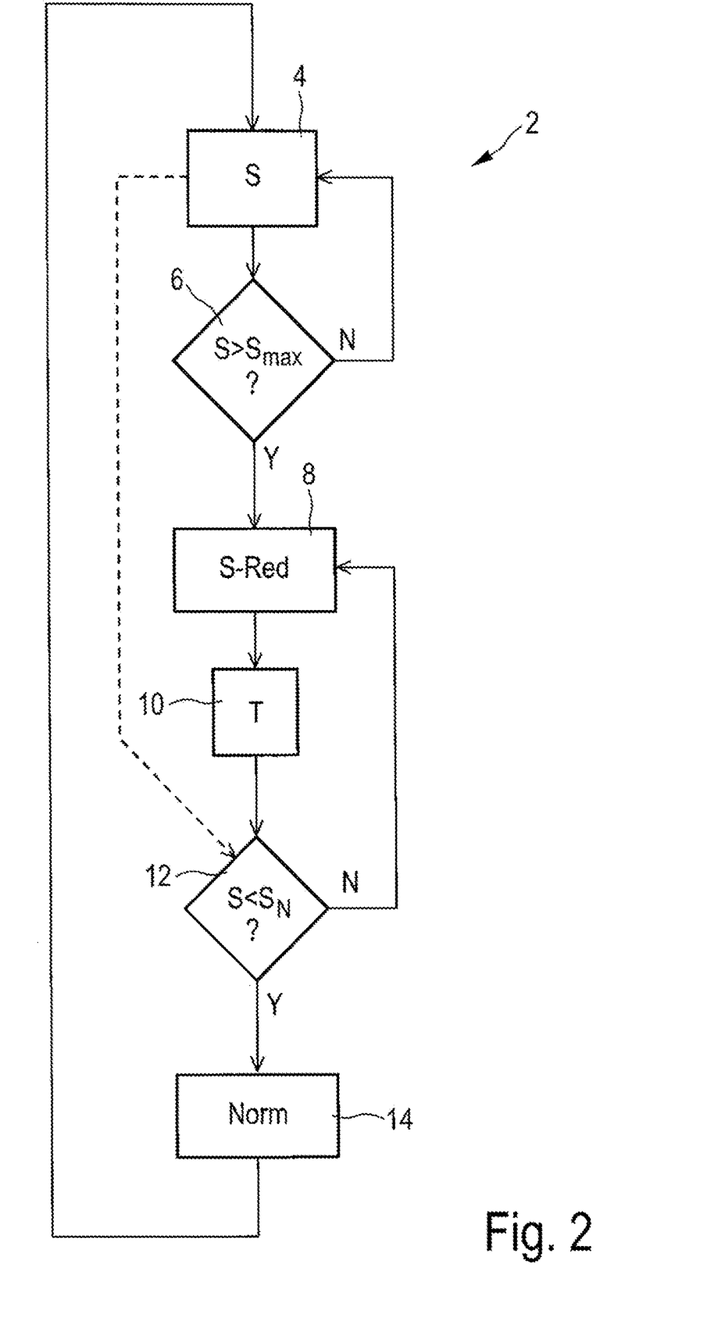
FIG. 2 shows a simplified flow diagram explaining oscillation reduction according to one embodiment of the invention.

FIG. 2 shows a simplified flow diagram 2, starting with a measuring block 4. In the measuring block 4, a longitudinal oscillation is recorded, for example by means of an acceleration amplitude which can be measured by respective acceleration sensors at the top of the tower. The recorded longitudinal oscillation is symbolically marked in the measuring block 4 with the letter S.

In the first test block 6, which can also be referred to as exceedance test block 6, the recorded value for S is continuously being compared with a predefined threshold value, which, in this context, is referred to as $S_{max}$. The embodiment shown in FIG. 2 does not account for a potential recording of a transverse oscillation.

If it is found in the first test block 6 that the recorded longitudinal oscillation S does not exceed the predefined threshold value $S_{max}$, no further steps will be taken and the method will logically return to measuring the longitudinal oscillation S in the measuring block 4.

If, however, it is noticed in the first measuring block 6 that the longitudinal oscillation S exceeds the predefined threshold value $S_{max}$, oscillation reduction, which is symbolically marked as S-Red, will be performed in the oscillation reduction block 8. The oscillation reduction measure performed there can refer to one or several measures. It can refer to freezing the pitch angle, switching the pitch control algorithm, adjusting the yaw position, switching the operation of the first wind turbine from a first into a second operating mode and/or synchronizing the rotational speeds of two neighboring wind turbines.

Once at least one of these oscillation reduction measures has been performed or initiated, the expiration of a predefined waiting time T is waited for in the holding block 10, which can also be referred to as a waiting block. Once the predefined waiting time T has expired, longitudinal oscillation is tested in the second test block 12, which can also be referred to as normalization test block 12, whether or not the recorded longitudinal oscillation S is now below the predefined threshold value $S_{max}$. Instead of the predefined threshold $S_{max}$, which the first test block 6 is also based on, another, smaller value can be used in this block, e.g., a normalization threshold $S_N$. While the flow diagram 2 shows a measuring block 4, which marks the start of the described process, the oscillation amplitude is constantly being recorded and thus also continues to be recorded, even during the waiting time pursuant to the symbolically illustrated waiting block 10. Thus, for the assessment in the second test block 12, an updated value of the longitudinal oscillation S is available. This is illustrated by the dotted line with the arrow from the measuring block 4 to the second test block 12.

If the second test block 12 finds that the longitudinal oscillation S and its amplitude have not fallen below the normalization threshold $S_N$, the oscillation reduction measure according to block 8 will be continued for the time being. Accordingly, the process will go back from the second test block 12 to the oscillation reduction block 8.

If, however, the oscillation amplitude is smaller than the normalization threshold value $S_N$, the process will continue with the normalization block 14. The normalization block 14, which for the purposes of illustration is marked as 'Norm', stops the measure or measures initiated in the oscillation reduction block 8. The process starts again, which is symbolized by the measuring block 4.

Figure 3:
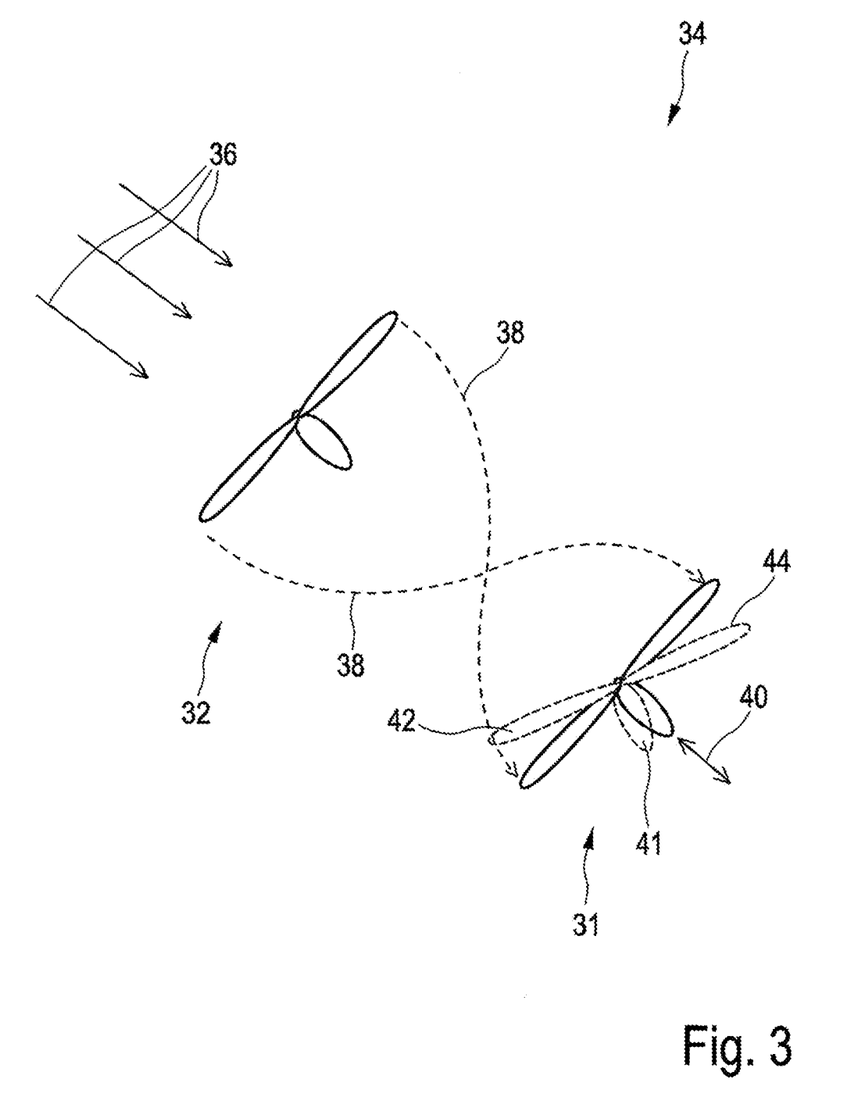
FIG. 3 shows a schematic top view of two wind turbines illustrating their mutual impact.

FIG. 3 shows a schematic top view of a first wind turbine 31 and a second wind turbine 32. Thus, these two wind turbines can form a wind farm 34 or at least be two wind turbines of the many wind turbines of a wind farm 34.

FIG. 3 shows a very specific situation, where the wind 36, or the wind direction 36, is directed at the second wind turbine 32 in such a way that, with regard to the wind direction 36, the first wind turbine 31 is operated exactly behind the second wind turbine 32.

For illustration purposes and merely schematically, two propeller lines 38 are indicated by dotted lines, which are intended to illustrate how the wind 36 reaching the second wind turbine 32 is changed by this second wind turbine 32 and proceeds to the first wind turbine 31. In reality, a lot of turbulence will occur and, essentially, the propeller line 38 is to illustrate that the first wind turbine 31 is not only in the wind shadow of the second wind turbine 32, but that the quality or type of wind flow is also changed by the second wind turbine 32 and reaches the first wind turbine 31 in a respectively changed condition.

This can trigger or increase oscillations at the first wind turbine 31. A longitudinal oscillation 40 is illustrated by the double arrow at the first wind turbine 31.

In addition, the first wind turbine 31 is shown in FIG. 3 by dotted lines as swiveled first wind turbine 41. This swiveling, namely swiveling or adjustment of the yaw position or yaw orientation only serves for illustration purposes. The angle actually shown is comparably large and in practice is mostly set to smaller values. The swiveled wind turbine 41, indicated by the dotted line, is to illustrate, especially with the propeller line 38 shown for illustration purposes that the wind changed by the second wind turbine 32 reaches the wind turbine 41 with the adjusted yaw position entirely differently. In particular, potential turbulence reaches the wind turbine at different times. This is to be illustrated by the fact that one of the propeller lines now reaches a first rotor blade 42, illustrated by a dotted line, sooner, while the second rotor blade 44, also illustrated by a dotted line, is reached later due to the changed wind, which is to be illustrated by the distance to the respective propeller line 38. Solely by way of precaution, it is pointed out that FIG. 3 only shows two rotor blades for each one of the first and second wind turbines 31 and 32 respectively, while, according to a preferred embodiment, the wind turbine comprises three rotor blades, as shown in FIG. 1.

Thus, according to one embodiment of the invention, a measure for reducing, preventing or interrupting or stopping an excessively large longitudinal oscillation of a wind turbine is proposed, which, essentially, is based on the approach of proposing a short-term change of the operating behavior of the wind turbine, wherein, after the successful termination of such a measure, the respective wind turbine can return to its previous operating mode or can continue to be operated normally. To this end, threshold values of the longitudinal oscillation, which can be, for example, in the area of 400 and 500 mm for the oscillation displacement of the top of a steel tower, or in the area of 40 to 50 mm for the oscillation displacement at the top of a concrete tower, can be used as a basis. A specific problem was identified when, with regard to the prevailing wind, wind turbines are located precisely behind each other. Increasing the excitation of a synchronous generator used in the wind turbine is also an option. This can be achieved by increasing the excitation current or by feeding a reactive power share into the generator, since this, too, can lead to increased excitation.

Figure 4:
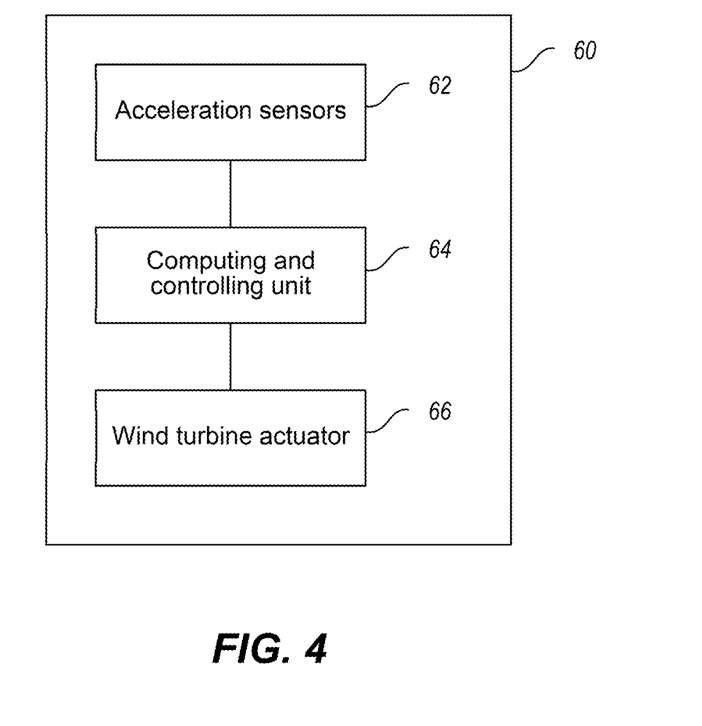
FIG. 4 shows a block diagram of components for performing one or more methods according to one embodiment of the invention.

FIG. 4 shows a block diagram 60 of components in the wind turbine 100 of FIG. 1 for performing the methods described herein. The block diagram 60 includes at least one measuring device, such as acceleration sensors 62, that may be located on an upper portion of the tower 102 (FIG. 1) or in the nacelle 104. The acceleration sensors 62 are coupled, either wirelessly or directly, to a computing and controlling unit 64. The acceleration sensors 62 are configured to send one or more signals indicative of measurements made to the computing and controlling unit 64. The acceleration sensor 62 is configured to initiate one or more measurements in response to receiving one or more signals from the computing and controlling unit 64.

The computing and controlling unit 64 includes the algorithms discussed above. The computing and controlling unit 64 may be located in the nacelle 104 or the base of the tower 102. The computing and controlling unit 64 may comprise a plurality of computing and controlling units for performing the functions described herein or may be a single computing and controlling unit.

The computing and controlling unit 64 is coupled to a wind turbine actuator 66. The wind turbine actuator 66 may include one or more actuating components that are configured to initiate various steps of the methods described above. For instance, the wind turbine actuator may be configured to control the pitch angle of the rotor blade or change the operating mode from a first operating mode to a second operating in response to receiving a signal from the computing and controlling unit 64.

Figure 5:
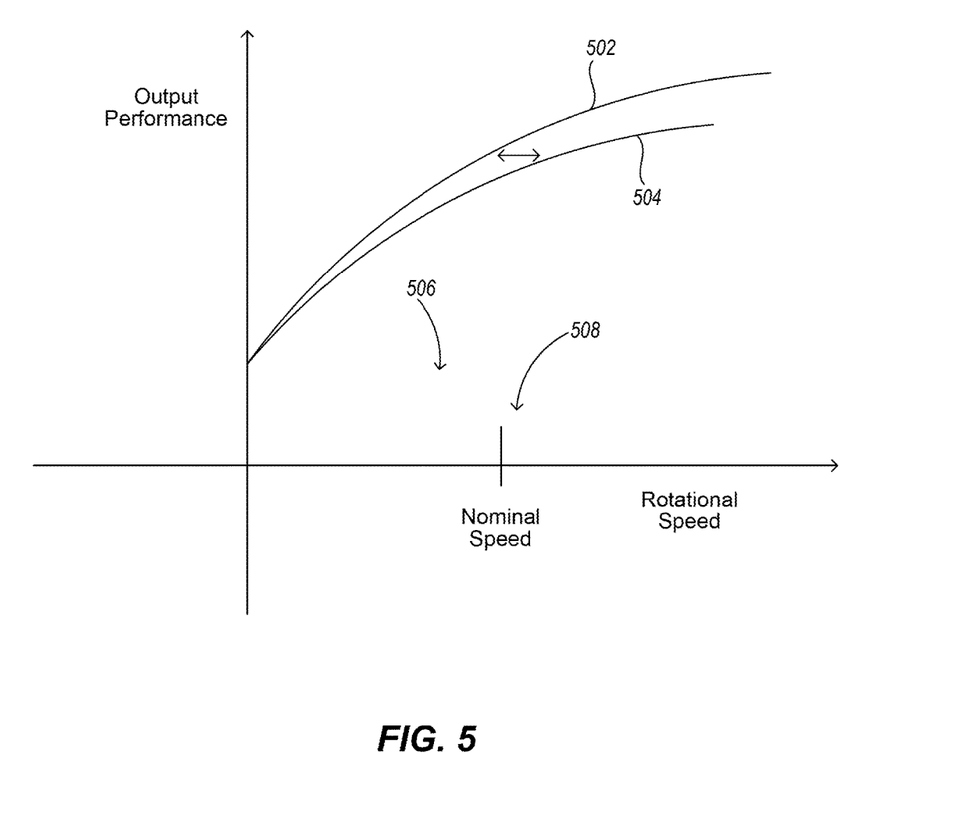
FIG. 5 shows an example of a first power curve and a second power curve.

FIG. 5 shows an example of a first power curve 502 and a second power curve 504. As shown in FIG. 5, there is a shift in the second power curve 504 in an area of transition between partial-load operation 506 and full-load operation 508.

Figure 6:
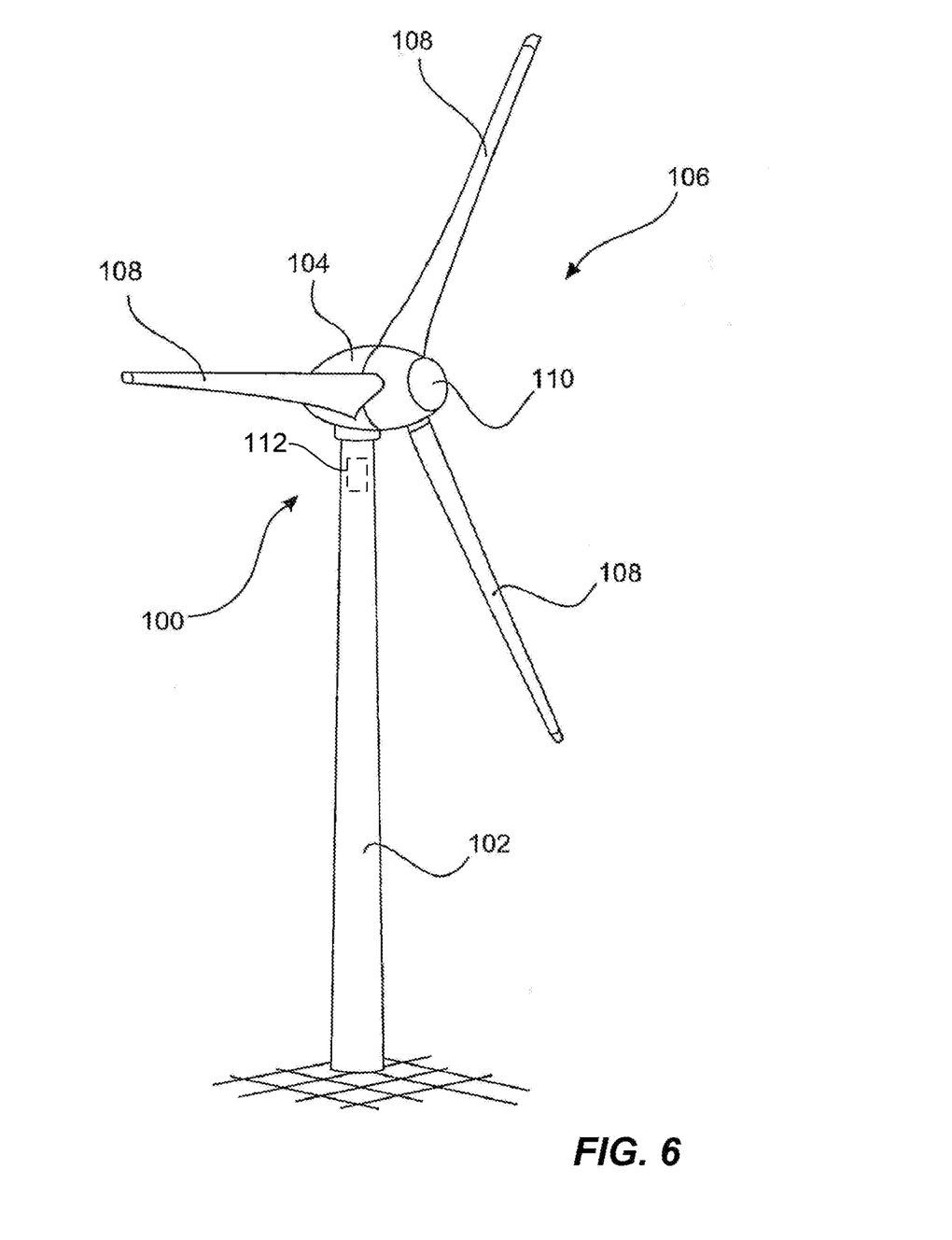
FIG. 6 shows a perspective view of the wind turbine including a measuring device.

FIG. 6 shows a perspective view of the wind turbine including a measuring device 112. The measuring device 112 is located in an upper portion of the tower 102 of the wind turbine 100.

Figure 7:
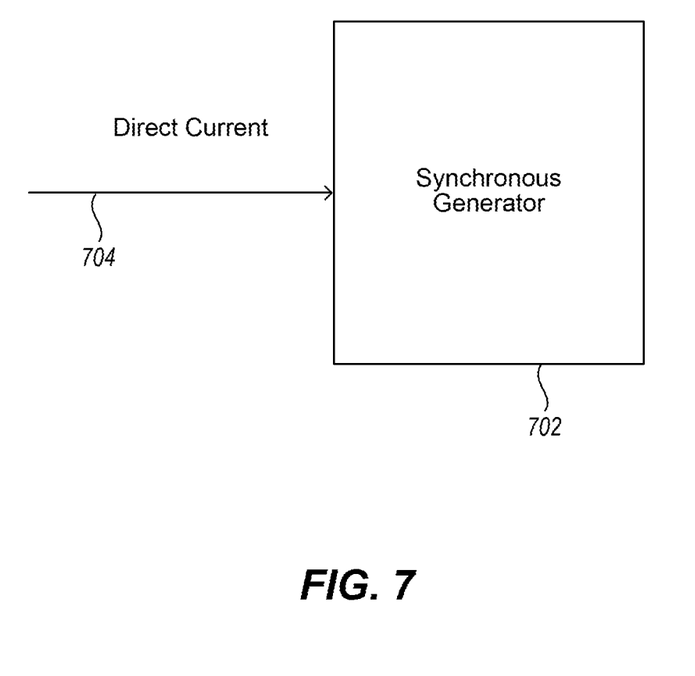
FIG. 7 shows a synchronous generator provided with direct current.

FIG. 7 shows a synchronous generator 702 provided with direct current 704.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating at least a first wind turbine, the method comprising:
   detecting a tower oscillation, and
   initiating an action to reduce oscillation when the tower oscillation includes a longitudinal oscillation and an amplitude of the longitudinal oscillation exceeds a predefined threshold value, and
   wherein the action for reducing the oscillation includes freezing a current pitch angle at a current value for a predefined freezing period, wherein the action for reducing the oscillation further includes
   switching operation of the first wind turbine from a first operating mode based on a first power curve to a second operating mode based on a second, different power curve, wherein switching the operation of the first wind turbine from the first operating mode to the second operating mode occurs when the first wind turbine in a wind park is located downwind from the second wind turbine, wherein the operating mode of the second wind turbine is not changed.

2. The method according to claim 1, wherein the predefined freezing period is in a range between 5 seconds and 1 minute.

3. The method according to claim 2 wherein the predefined freezing period is in a range between 10 and 20 seconds.

4. The method according to claim 1 wherein a predefined yaw angle is in a range between 2° and 8°.

5. The method according to claim 4 wherein the predefined yaw angle is in a range between 4° and 5°.

6. The method according to claim 1 wherein a differential rotational speed is at least 0.2 rpm.

7. The method according to claim 6 wherein the differential rotational speed is 0.5 rpm.

8. The method according to claim 1 wherein the first wind turbine is at least one of pitch controlled and has a variable rotational speed.

9. The method according to claim 1 wherein the first and the second power curves, respectively, provide a specified output performance depending on a rotational speed, and that, with respectively the same rotational speed values, performance values of the second power curve are lower than performance values of the first power curve.

10. The method according to claim 1 wherein:
   when a prevailing wind speed corresponds to or exceeds a nominal wind speed, the action for reducing the oscillation includes
   switching pitch control,
   when the prevailing wind speed is below the nominal wind speed, the action for reducing the oscillation is at least one of:
   adjusting a yaw position,
   switching the operation of the first wind turbine, and
   changing the rotational speed of the first wind turbine is performed in a partial-load operation.

11. The method according to claim 1 wherein the second power curve is shifted in an area of a transition between partial-load operation and full-load operation.

12. The method according to claim 1 wherein a second pitch control algorithm has a lower control speed than a first pitch control algorithm.

13. The method according to claim 1, wherein the action further includes:

switching a first pitch control algorithm to a second pitch control algorithm that is different from the first pitch control algorithm, adjusting a yaw position of a rotor blade by a predefined yaw angle, and adjusting a rotational speed of the first wind turbine such that the rotational speed of the first wind turbine differs from a rotational speed of the second wind turbine by at least a predefined differential rotational speed.

14. A first wind turbine for generating electrical energy from wind, the first wind turbine comprising:

a tower;

at least one measuring device located at an upper portion of the tower, the at least one measuring device configured to generate one or more signals indicative of longitudinal oscillations of the tower;

a nacelle located on the tower;

a rotor coupled to the nacelle;

at least one rotor blade coupled to the rotor; and a computing and controlling unit configured to receive the one or more signals from the at least one measuring device and determine whether the longitudinal oscillation exceeds a predefined threshold value, and when the longitudinal oscillation exceeds the predefined threshold value, the computing and controlling unit is configured to initiate freezing a current pitch angle at a current value for a predefined freezing period, wherein the computing and controlling unit is configured to initiate switching operation of the first wind turbine from a first operating mode based on a first power curve to a second operating mode based on a second, different power curve, wherein switching the operation of the wind turbine from the first operating mode to the second operating mode occurs when the wind turbine in a wind farm is located downwind from a second wind turbine, wherein the operating mode of the second wind turbine is not changed.

15. The first wind turbine according to claim 14 wherein an excitation current of the first wind turbine is increased or decreased by 2-8%.

16. The first wind turbine according to claim 15 wherein the excitation current of the first wind turbine is increased or reduced by 4-5%.

17. A wind farm with at least one first wind turbine according to claim 14.

18. The first wind turbine according to claim 14 wherein the at least one measuring device is an acceleration sensor.

19. The first wind turbine according to claim 14 wherein the computing and controlling unit is further configured to initiate switching a first pitch control algorithm to a second pitch control algorithm that is different from the first pitch control algorithm and adjusting a yaw position of the rotor blade by a predefined yaw angle.

20. A method for operating a first wind turbine, the method comprising:

detecting a tower oscillation, and initiating an action to reduce oscillation when the tower oscillation includes a longitudinal oscillation and an amplitude of the longitudinal oscillation exceeds a predefined threshold value, and wherein the action for reducing the oscillation includes freezing a current pitch angle at a current value for a predefined freezing period, wherein the action for reducing the oscillation further includes switching operation of the first wind turbine from a first operating mode based on a first power curve to a second operating mode based on a second, different power curve, wherein switching the operation of the first wind turbine from the first operating mode to the second operating mode occurs when the first wind turbine in a wind park is located downwind from the second wind turbine, wherein the operating mode of the second wind turbine is not changed, and wherein:

when a prevailing wind speed corresponds to or exceeds a nominal wind speed, the action for reducing the oscillation includes:

switching pitch control, when the prevailing wind speed is below the nominal wind speed, the action for reducing the oscillation is at least one of:

adjusting a yaw position, switching the operation of the first wind turbine, and changing the rotational speed of the first wind turbine is performed in a partial-load operation.

21. The method according to claim 20 wherein the action for reducing the oscillation further includes switching a first pitch control algorithm to a second pitch control algorithm that is different from the first pitch control algorithm, and adjusting the yaw position of a rotor blade by a predefined yaw angle.

* * * * *